US012678868B2

(12) United States Patent
Saitoh et al.

(10) Patent No.: US 12,678,868 B2
(45) Date of Patent: Jul. 14, 2026

(54) END MILL

(71) Applicant: MOLDINO TOOL ENGINEERING, LTD., Tokyo (JP)

(72) Inventors: Hiroto Saitoh, Yasu (JP); Yuta Haga, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 572 days.

(21) Appl. No.: 18/032,244

(22) PCT Filed: May 30, 2022

(86) PCT No.: PCT/JP2022/021921
§ 371 (c)(1),
(2) Date: Apr. 17, 2023

(87) PCT Pub. No.: WO2022/255296
PCT Pub. Date: Dec. 8, 2022

(65) Prior Publication Data
US 2023/0390836 A1    Dec. 7, 2023

(30) Foreign Application Priority Data
May 31, 2021    (JP) ................................. 2021-091625

(51) Int. Cl.
B23C 5/10        (2006.01)
(52) U.S. Cl.
CPC .................................... B23C 5/10 (2013.01)
(58) Field of Classification Search
CPC .. B23C 5/10; B23C 5/16; B23C 5/165; B23C 2210/0492; B23C 2210/40;
(Continued)

(56) References Cited

U.S. PATENT DOCUMENTS 3,736,634 A * 6/1973 Sonnie ...................... B23C 5/10
                                                          407/54
4,285,618 A * 8/1981 Shanley, Jr. .............. B23C 5/10
                                                          407/57
(Continued)

FOREIGN PATENT DOCUMENTS

CA        3009030 A1    5/2018
CN      211360799 U    8/2020
(Continued)

OTHER PUBLICATIONS

International Search Report mailed Jul. 19, 2022, issued for PCT/JP2022/021921 and English translation thereof.
(Continued)

*Primary Examiner* — Nicole N Ramos
(74) *Attorney, Agent, or Firm* — Troutman Pepper Locke LLP; James E. Armstrong; Gabrielle L. Gelozin

(57)        ABSTRACT

An end mill includes: an end mill body configured to be rotatable around an axis; a chip discharge groove configured to extend from a tip in an axial direction of the end mill body toward a rear end side in the axial direction while twisting around the axis; and outer peripheral cutting edges each being configured to be formed at an intersection ridge portion on a forward side in a rotation direction between the chip discharge groove and an outer peripheral flank face. At least one outer peripheral cutting edge includes a plurality of notch portions that discontinue the outer peripheral cutting edge. Circumferential positions of all the notch portions in the end mill body do not overlap each other.

11 Claims, 6 Drawing Sheets

(58) Field of Classification Search
CPC .......... B23C 2210/48; B23C 2210/486; B23C 2210/0485; B23C 2210/086; B23C 2226/27
See application file for complete search history.

(56) References Cited

U.S. PATENT DOCUMENTS

| | | | | |
|---|---|---|---|---|
| 4,497,600 | A * | 2/1985 | Kishimoto | B23C 5/10 407/53 |
| 4,721,421 | A * | 1/1988 | Klinger | B23C 5/10 407/54 |
| 4,810,136 | A * | 3/1989 | Paige | B23C 5/10 407/54 |
| 6,997,651 | B2 * | 2/2006 | Kawai | B23C 5/10 407/53 |
| 8,366,354 | B2 * | 2/2013 | Davis | B23C 5/10 407/53 |
| 8,827,600 | B2 * | 9/2014 | Maeda | B23C 5/10 407/53 |
| 9,616,505 | B2 * | 4/2017 | Haimer | B23C 5/003 |
| 9,884,376 | B2 * | 2/2018 | Huth | B23C 5/10 |
| 2002/0090273 | A1 | 7/2002 | Serwa | |
| 2015/0147127 | A1 * | 5/2015 | Shpigelman | B23C 5/10 407/54 |
| 2015/0158095 | A1 | 6/2015 | Strasmann | |
| 2020/0290134 | A1 * | 9/2020 | Waki | B23C 5/10 |
| 2022/0072628 | A1 * | 3/2022 | Bonfiglio | B23B 47/34 |

FOREIGN PATENT DOCUMENTS

| | | | |
|---|---|---|---|
| JP | S59047110 | A | 3/1984 |
| JP | S60-100111 | U | 7/1985 |
| JP | H02-256412 | A | 10/1990 |
| JP | H5-37411 | U | 5/1993 |
| JP | H05-078421 | U | 10/1993 |
| JP | H06-114621 | A | 4/1994 |
| JP | H06-335814 | A | 12/1994 |
| JP | H07-017413 | U | 3/1995 |
| JP | 2000107925 | A | 4/2000 |
| JP | 2006-000981 | A | 1/2006 |
| JP | 2011-000696 | A | 1/2011 |
| JP | 2011-020248 | A | 2/2011 |
| JP | 2011067928 | A | 4/2011 |
| JP | 2012-518550 | A | 8/2012 |
| JP | 2012-206197 | A | 10/2012 |
| WO | 2010/096328 | A2 | 8/2010 |
| WO | 2014181811 | A1 | 11/2014 |
| WO | 2018092184 | A1 | 5/2018 |
| WO | 2018198930 | A1 | 11/2018 |

OTHER PUBLICATIONS

International Preliminary Report on Patentability mailed Mar. 20, 2023, issued for PCT/JP2022/021921 and English translation thereof.
International Search Report mailed Jul. 19, 2022, issued for PCT/JP2022/021924 and English translation thereof.
Office Action mailed Oct. 15, 2024, issued for JP2023-525814 and English translation thereof.
Japanese Office Action dated Jul. 2, 2024, issued during the prosecution of Japanese Patent Application No. JP 2023-525814 with English translation.
Notice of Allowance issued in corresponding Chinese Patent Application No. CN 202280007381.9, mailed Oct. 29, 2025, with English translation.

* cited by examiner

END MILL

TECHNICAL FIELD

The present invention relates to an end mill in which a notch portion (nick) is provided in an outer peripheral cutting edge.

Priority is claimed on Japanese Patent Application No. 2021-091625, filed May 31, 2021, the content of which is incorporated herein by reference.

BACKGROUND ART

In the related art, when high-efficiency machining is performed, a configuration is known in which an outer peripheral cutting edge partly includes a notch portion (nick) that breaks off chips.

Such an end mill with the notch portion is advantageous in chip discharge performance since the chip length can be broken off and shortened by the notch portion provided in the outer peripheral cutting edge.

PRIOR ART DOCUMENT

Patent Document

[Patent Document 1]
Japanese Unexamined Patent Application, First Publication No. 2011-000696

SUMMARY OF THE INVENTION

Problems to be Solved by the Invention

Particularly, there is an increasing need to improve machining efficiency, and when cutting with a significantly large axial cutting depth, cutting speed, feed rate, and the like is performed, or when the ratio of a blade length to a blade diameter is large, the conventional end mill with the notch portion (nick) cannot sufficiently suppress chatter vibration or chipping, and there is a concern that the life of the end mill itself will be shortened.

The present invention is conceived under such a background, and an object of the present invention is to provide an end mill capable of performing high-efficiency and stable cutting.

Means for Solving the Problem

According to one aspect of the present invention, it is provided an end mill including: an end mill body configured to be rotatable around an axis; chip discharge grooves configured to extend from a tip side in an axial direction of the end mill body toward a rear end side in the axial direction while twisting around the axis; and outer peripheral cutting edges each being configured to be formed at an intersection ridge portion on a forward side in a rotation direction between the chip discharge groove and an outer peripheral flank face. At least one outer peripheral cutting edge includes a plurality of notch portions that discontinue the outer peripheral cutting edge, and circumferential positions of all the notch portions in the end mill body do not overlap each other.

By providing the notch portions in the outer peripheral cutting edges, the chip length can be reduced, and the occurrence of chipping caused by the biting of chips can be suppressed. For this reason, by increasing the number of the notch portions, more efficient machining can be performed.

On the other hand, since the notch portion has a non-cutting region, which does not come into contact with a workpiece, on an extension line of the outer peripheral cutting edge, the notch portion is a location where the cutting resistance is decreased, in other words, a location where the cutting resistance varies during cutting.

The inventors have found that as the number of the notch portions in the end mill body is increased, the positions of the notch portions in the end mill body (for example, the notch portions provided in the different outer peripheral cutting edges) are more likely to be unintentionally aligned in the axial direction (circumferential positions overlap each other), and during cutting, the number of locations where variations in cutting resistance are locally large (locations where the notch portions are concentrated and the cutting resistance is locally reduced) is increased, resulting in promoting vibration.

In this configuration, the at least one outer peripheral cutting edge includes the plurality of notch portions, and all the notch portions in the end mill body are disposed such that the circumferential positions of the notch portions do not overlap each other. For this reason, even when significantly efficient cutting is performed, sufficient chip breaking ability can be ensured, and chipping caused by the biting of chips can be suppressed. In addition, by dispersedly disposing the plurality of notch portions in a circumferential direction, regardless of the number of the notch portions in the end mill body, during cutting, the timing of the occurrence of variations can be dispersed while suppressing variations in cutting resistance to a low level, and the occurrence of chatter vibration can be suppressed.

Therefore, in the present invention, due to the synergistic effect of the at least one outer peripheral cutting edge including the plurality of notch portions and the circumferential positions of all the notch portions in the end mill body not overlapping each other, chatter vibration or chipping can be suppressed, and stable and high-efficiency machining can be performed.

At least one spacing among spacings between front ends in the rotation direction of two notch portions adjacent in a circumferential direction, may be different from the other spacings.

According to this configuration, the timing that the cutting resistance in the end mill body decreases can be made more irregular. Chatter vibration or chipping of the outer peripheral cutting edges can be suppressed, and more stable and high-efficiency cutting can be performed.

In the related art, as the axial length (blade length) of the outer peripheral cutting edges becomes longer, more efficient cutting can be performed, but chatter vibration is more likely to occur. Therefore, at least one outer peripheral cutting edge may include a plurality of the notch portions, the blade length may be set to be equal to or more than two times the blade diameter, and all the notch portions in the end mill body may be disposed such that the circumferential positions do not overlap each other.

By implementing such a configuration, even when cutting is performed under machining conditions in which the axial cutting depth is large and the efficiency is significantly higher than in the related art, during cutting, variations in cutting resistance are small and the timing of the occurrence of the variations is dispersed. For this reason, chatter vibration or chipping of the outer peripheral cutting edges can be suppressed, and more stable and high-efficiency machining can be performed.

Five or more outer peripheral cutting edges may be provided.

In the related art, as the number of cutting edges is increased, more efficient cutting can be performed, but chatter vibration is more likely to occur.

On the other hand, in this configuration, the at least one outer peripheral cutting edge includes the plurality of notch portions, the live or more outer peripheral cutting edges are provided, and all the notch portions in the end mill body are disposed such that the circumferential positions do not overlap each other. Accordingly, even when cutting is performed under high-efficiency machining conditions in which the feed rate is significantly large, the biting of chips is less likely to occur, and during cutting, variations in cutting resistance are small and the timing of the occurrence of the variations is dispersed. For this reason, chatter vibration or chipping of the outer peripheral cutting edges can be suppressed, and more stable and high-efficiency machining can be performed.

Twist angles of all the outer peripheral cutting edges may be 350 or more.

Since the twist angles are set to 350 or more, the at least one outer peripheral cutting edge includes the plurality of notch portions, and the circumferential positions of all the notch portions in the end mill body do not overlap each other, even when cutting is performed under high-efficiency machining conditions in which the feed rate is significantly large, during cutting, variations in cutting resistance are small and the timing of the occurrence of the variations is dispersed. For this reason, more stable and high-efficiency machining can be performed while suppressing chatter vibration or chipping of the outer peripheral cutting edges.

The notch portions may be disposed such that among continuous blade lengths which continue in an extending direction of the outer peripheral cutting edges, a maximum continuous blade length in the end mill body is equal to or less than three times a blade diameter.

In the related art, when a large number of the notch portions are provided in the end mill body such that the maximum continuous blade length of the outer peripheral cutting edges in the end mill body becomes equal to or less than three times the blade diameter, chatter vibration or chipping is more likely to occur.

Therefore, by implementing the configuration in which the at least one outer peripheral cutting edge includes the plurality of notch portions, a sufficient number of the notch portions are provided such that the maximum continuous blade length in the end mill body becomes equal to or less than three times the blade diameter, and the circumferential positions of all the notch portions in the end mill body do not overlap each other, the biting of chips can be sufficiently suppressed, and during cutting, variations in cutting resistance are small and the timing of the occurrence of the variations is dispersed. For this reason, chatter vibration or chipping of the outer peripheral cutting edges can be suppressed, and more stable and high-efficiency machining can be performed.

The notch portions may be disposed such that among continuous blade lengths which continue in an extending direction of the outer peripheral cutting edges, a minimum continuous blade length in the end mill body is equal to or more than 0.6 times a blade diameter. The number of the notch portions can be prevented from becoming excessive, and the number of locations where the cutting resistance varies can be prevented from becoming excessive. Accordingly, more stable and high-efficiency machining can be performed.

Twist angles of all the outer peripheral cutting edges may be equal to each other.

According to this configuration, with a simpler configuration, high-efficiency cutting can be performed while suppressing chipping of the outer peripheral cutting edges.

In the related art, in order to suppress the occurrence of chatter vibration in performing high-efficiency machining, complicated outer peripheral cutting edges in which the twist angle is changed between the outer peripheral cutting edges are formed.

In this configuration, since the at least one outer peripheral cutting edge includes the plurality of notch portions, and the circumferential positions of all the notch portions do not overlap each other, even when the twist angles of all the outer peripheral cutting edges are equalized, the biting of chips are less likely to occur, and during cutting, variations in cutting resistance are small and the timing of the occurrence of the variations is dispersed. For this reason, chatter vibration or chipping of the outer peripheral cutting edges can be suppressed, and more stable and high-efficiency cutting can be performed.

Each of the notch portions may be disposed such that the notch portion closest to each of the notch portions in axial position is different from the notch portion closest to each of the notch portions in circumferential position.

According to this configuration, the disposition spacing between the notch portions in the circumferential direction can be appropriately set, and during cutting, a location where variations in cutting resistance are locally large is less likely to occur, and chatter vibration is less likely to occur. More stable and high-efficiency cutting can be performed.

The end mill may be configured such that the outer peripheral cutting edges is rightward twisted, and all the notch portions are disposed such that among two notch portions which are adjacent in axial position, the notch portion located on the rear end side in the axial direction is located forward in the rotation direction with respect to the notch portion located on the tip side in the axial direction.

According to this configuration, in the rightward twisted tool, by disposing the notch portions in the end mill body in a direction opposite a twist direction of the outer peripheral cutting edges, the notch portions can be disposed in the end mill body at a higher density. As a result, the number of the notch portions that can be disposed in the end mill body can be increased without overlapping the circumferential positions of all the notch portions in the end mill body. Therefore, according to this configuration, more stable and high-efficiency machining can be performed. Particularly, the present invention is more advantageous as the blade length increases with respect to the blade diameter.

Effects of the Invention

According to one aspect of the present invention, it is possible to provide the end mill capable of performing high-efficiency and stable cutting.

EMBODIMENTS OF THE INVENTION

Hereinafter, a configuration of an end mill according to each embodiment of the present invention will be described with reference to the drawings.

First Embodiment

Figure 1:
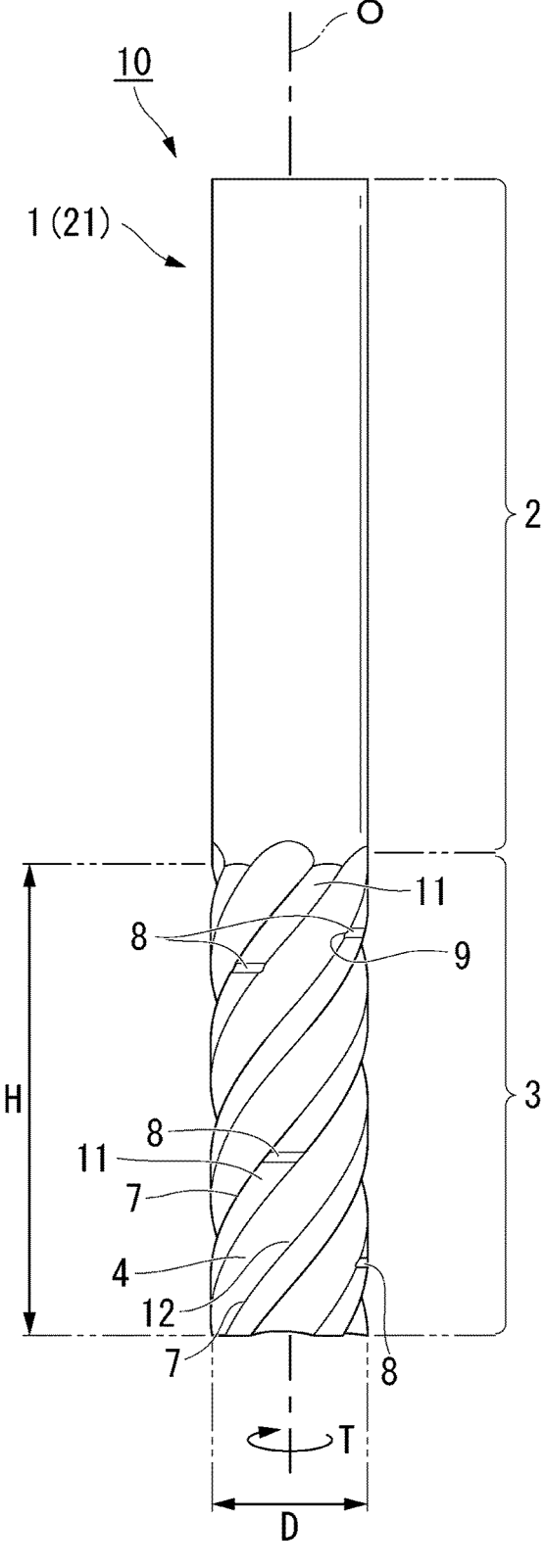
FIG. 1 is a view showing a configuration of an end mill according to a first embodiment.
Figure 2:
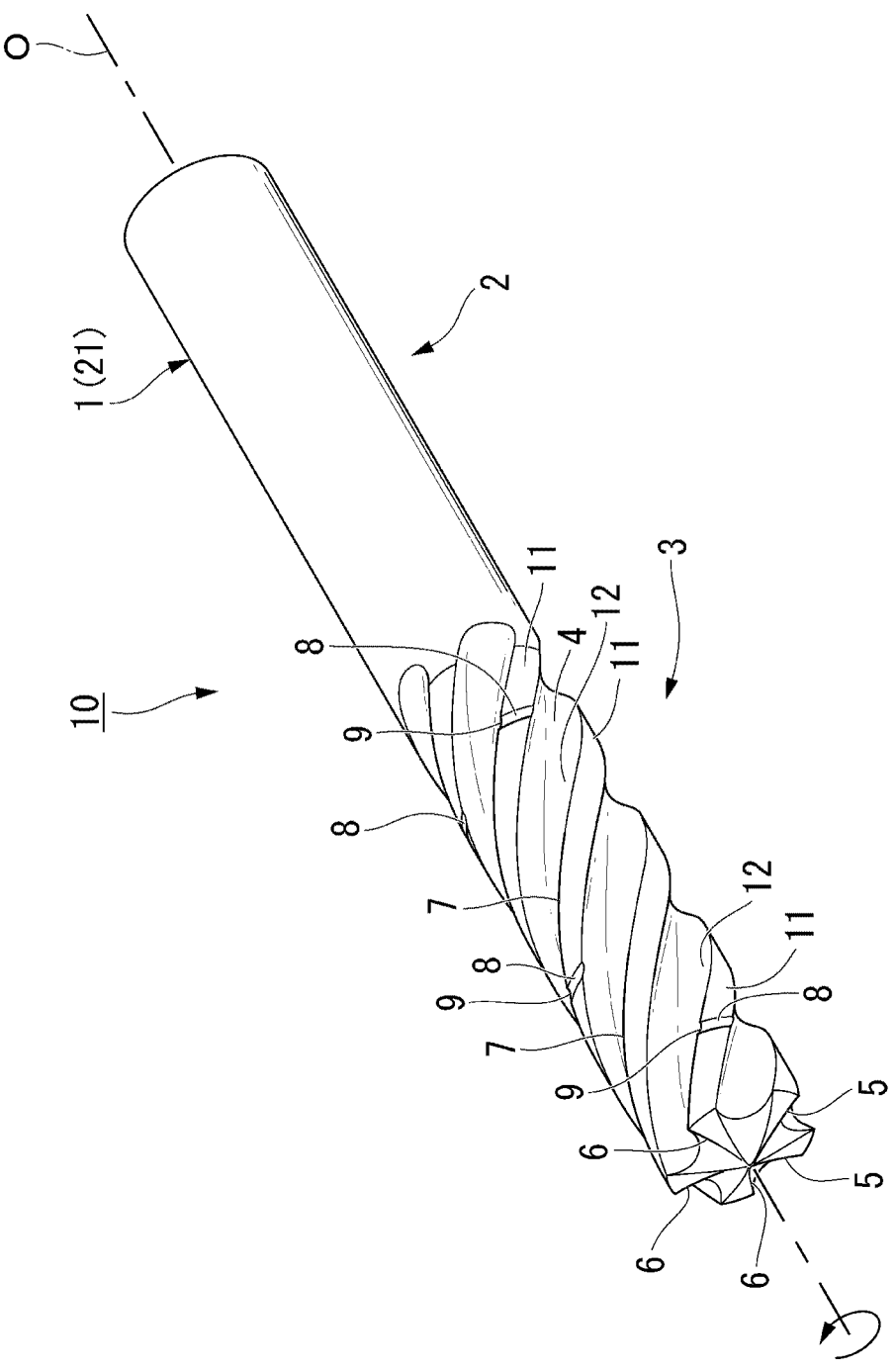
FIG. 2 is a perspective view showing a configuration of a cutting edge portion of the end mill according to the first embodiment.
Figure 3:
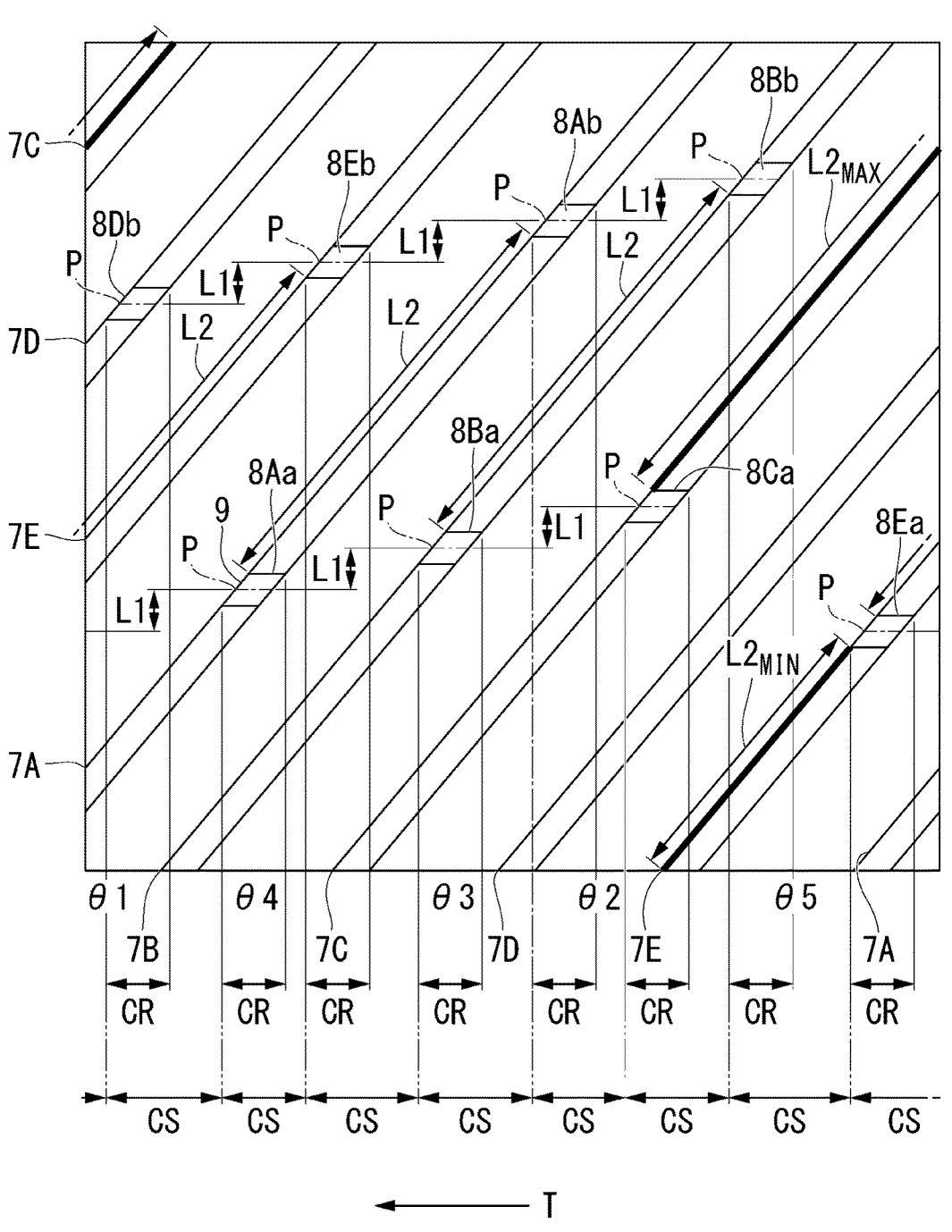
FIG. 3 is a developed view showing the entirety of an outer peripheral surface of a cutting edge portion of the end mill according to the first embodiment.
Figure 4:
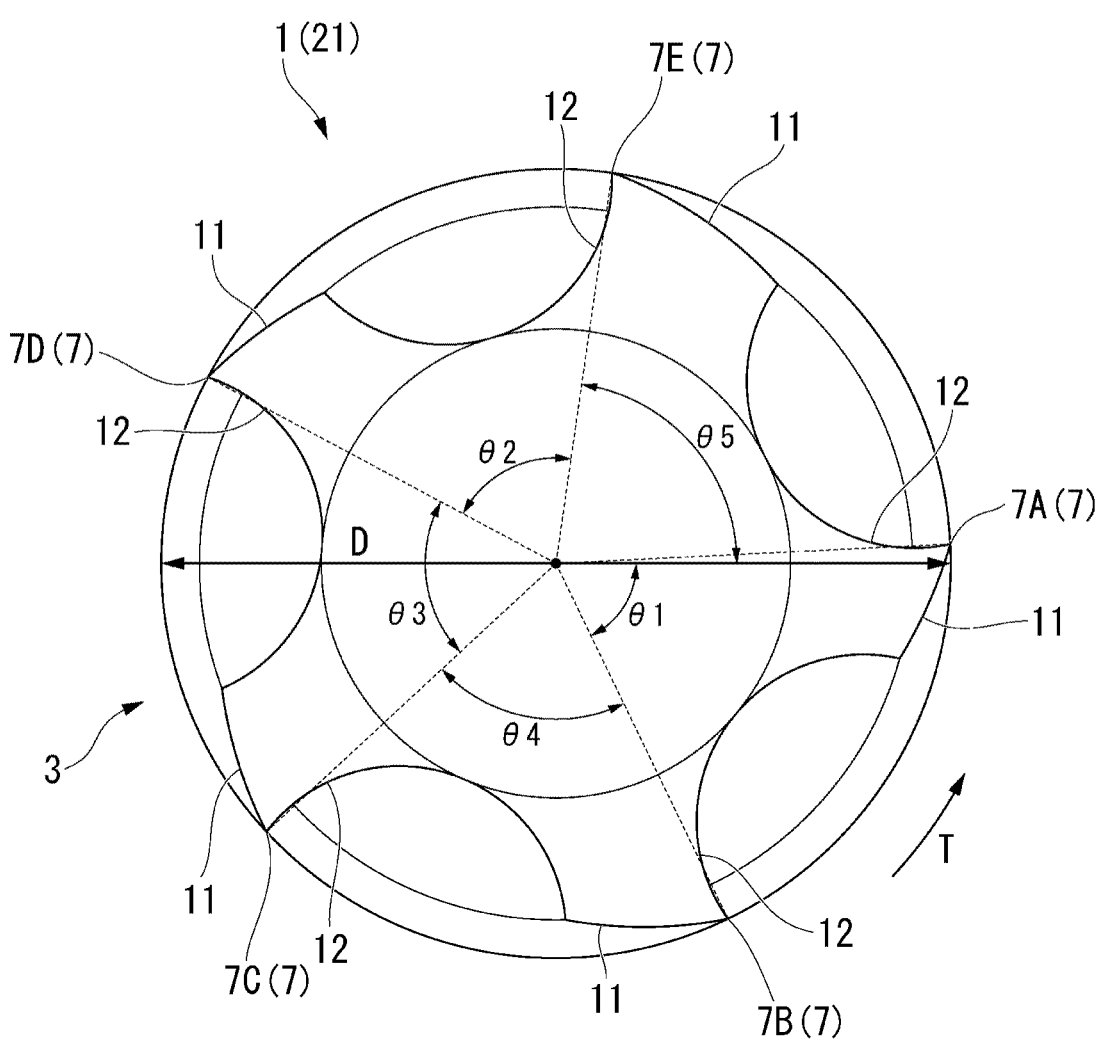
FIG. 4 is an axis-perpendicular cross-sectional view of an axial rear end of a cutting edge portion 3 of the end mill according to the first embodiment.

FIG. 1 is a view showing a configuration of an end mill according to a first embodiment. FIG. 2 is a perspective view showing a configuration of a cutting edge portion of the end mill according to the first embodiment. FIG. 3 is a developed view showing the entirety of an outer peripheral surface of a cutting edge portion of the end mill body according to the first embodiment. FIG. 4 is an axis-perpendicular cross-sectional view of the end mill according to the first embodiment.

An end mill 10 of the present embodiment shown in FIG. 1 includes an end mill body 1.

The end mill body 1 is made of a hard material such as cemented carbide, and is formed in a substantially columnar shape with an outer diameter centered on an axis O. A rear end portion (upper portion in FIG. 1) of the end mill body 1 is a shank portion 2 that remains in a columnar shape, and a tip portion (lower portion in FIG. 1) is a cutting edge portion 3.

By rotating the end mill body 1 around the axis O in an end mill rotation direction T with the shank portion 2 gripped by a spindle of a machine tool, for example, the end mill body 1 is fed out in a direction perpendicular to the axis O, and performs cutting on a workpiece.

A plurality of chip discharge grooves 4 twisting around the axis in a direction opposite the end mill rotation direction T from a tip to a rear end side (shank portion 2) in an axial direction of the end mill body 1 are formed in an outer periphery of the cutting edge portion 3. In the present embodiment, five chip discharge grooves 4 are formed at intervals in the end mill rotation direction T (around the axis).

An outer peripheral cutting edge 7 is formed at an intersection ridge portion on a forward side in the rotation direction between a rake face 12 which is a wall surface of each of the chip discharge grooves 4 facing forward in the end mill rotation direction T and an outer peripheral flank face 11 which is an outer peripheral surface of the cutting edge portion 3 adjacent to the rake face 12. In the present embodiment, five outer peripheral cutting edges 7 are formed at predetermined intervals in the end mill rotation direction T. At least one outer peripheral cutting edge 7 among the five outer peripheral cutting edges 7 includes a plurality of notch portions 8 that discontinue the outer peripheral cutting edge 7 in an extending direction of the outer peripheral cutting edge 7. In the present embodiment, all the outer peripheral cutting edges 7 include one or more notch portions 8 that discontinue the outer peripheral cutting edges 7 in the extending direction of the outer peripheral cutting edges 7 to break chips. In the present embodiment, the case where all the outer peripheral cutting edges 7 include one or more notch portions 8 is provided as an example; however, in embodiments of the present invention, it is acceptable as long as the cutting edge portion 3 includes a plurality of the notch portions 8, and there may exist the outer peripheral cutting edges 7 without the notch portions 8 provided. The outer peripheral cutting edges 7 extend spirally around the axis O.

As shown in FIG. 2, gashes 5 having a recessed groove shape are each formed at tip portions of the chip discharge grooves 4 along the wall surfaces of the chip discharge grooves 4 facing the forward side in the end mill rotation direction T. The end mill body 1 includes five gashes 5. At tip cutting edges of wall surfaces of the gashes 5 facing the end mill rotation direction T, bottom cutting edges 6 having the wall surfaces as rake faces are each formed to extend from tips of the outer peripheral cutting edges 7 to an inner peripheral side.

As shown in FIGS. 1 and 2, in the end mill body 1 of the present embodiment, one or more notch portions 8 are formed in each of the five outer peripheral cutting edges 7. Specifically, among the five outer peripheral cutting edges 7, two notch portions 8 are formed in each of three outer peripheral cutting edges 7, and one notch portion 8 is formed in each of the remaining two outer peripheral cutting edges 7. Each of the notch portions 8 is a recessed groove extending from one chip discharge groove 4 to the other chip discharge groove 4 in a circumferential direction and recessed inward in a radial direction. The notch portions 8 have the same shape on the rake faces 12. For example, the notch portion 8 partially has an arc-shaped cross section on the rake face 12 at a deepest position (hereinafter, a deepest portion P) in a direction orthogonal to the outer peripheral cutting edge 7.

As shown in FIG. 2, each of the notch portions 8 extends from one chip discharge groove 4 to the other chip discharge groove 4 adjacent thereto in the circumferential direction, to cross the outer peripheral flank face 11 in the circumferential direction. In other words, a forward side in the rotation direction of the notch portion 8 opens to the rake face 12 of one chip discharge groove 4, and a rearward side in the rotation direction of the notch portion 8 opens to another chip discharge groove 4. In addition, each of the notch portions 8 extends in an axis-perpendicular direction. The notch portions 8 extend in the circumferential direction around the axis.

The notch portion 8 of the present embodiment extends from one chip discharge groove 4 to the other chip discharge groove 4 adjacent thereto in the circumferential direction, so as to cross the outer peripheral flank face 11 in the circumferential direction; however, the notch portion 8 may have any shape and any circumferential length as long as the notch portion 8 discontinues the outer peripheral cutting edge 7. For example, the notch portion 8 may not reach the other chip discharge groove 4. An end portion on the rearward side in the end mill rotation direction T of the notch portion 8 may be located on the outer peripheral flank face 11.

FIG. 3 is a developed view showing the entirety of the outer peripheral surface of the cutting edge portion 3 of the end mill body 1. Namely, a right end of FIG. 3 is continuous with a left end of FIG. 3, an upper end of FIG. 3 means an axial rear end of the cutting edge portion 3, and a lower end of FIG. 3 means an axial tip of the cutting edge portion 3. As shown in FIG. 3, all the notch portions 8 in the end mill body 1 are disposed such that circumferential positions CR of the notch portions 8 do not overlap each other. This disposition is intended to prevent the plurality of notch portions 8 from coming into contact with the workpiece at the same time during cutting. For this reason, in the present embodiment, when viewed in an extending direction of the axis, the circumferential position CR of each of the notch portions 8 means the position of a region occupied by each of the notch portions 8 when the region (from a front end to a rear end in the rotation direction) of the notch portion 8 in the end mill body is projected onto the same axis-perpendicular plane.

The disposition in which "the circumferential positions do not overlap each other" is a disposition in which the positions of the regions occupied by the plurality of notch portions 8 do not overlap each other, and is a disposition in which the regions are separated from each other or are adjacent to each other. The circumferential position of the notch portion can also be represented by an angular range centered on the axis, when any location on the outer peripheral surface is set to 0°. For example, the circumferential positions of the notch portions can also be represented by angular ranges such as the circumferential position of a notch portion being 0° to 5° and the circumferential position of a notch portion adjacent to the notch portion in the circumferential direction being 10° to 15°.

In addition, each of the notch portions 8 has a non-cutting region 9 located on an extension line of the outer peripheral cutting edge 7. The non-cutting region 9 is a portion in which the outer peripheral cutting edge 7 is discontinuous in an extending direction of the outer peripheral cutting edge 7. The circumferential positions of all the non-cutting regions 9 in the end mill body 1 also do not overlap each other. By implementing the disposition in which not only the circumferential positions of the non-cutting regions 9 but also the circumferential positions of the notch portions 8 do not overlap each other, it is possible to suppress the induction of chatter vibrations even in significantly efficient machining.

As shown in FIG. 3, when the five outer peripheral cutting edges 7 arranged in the circumferential direction are each referred to as a first outer peripheral cutting edge 7A, a second outer peripheral cutting edge 7B, a third outer peripheral cutting edge 7C, a fourth outer peripheral cutting edge 7D, and a fifth outer peripheral cutting edge 7E in order toward the rearward side in the end mill rotation direction T, two notch portions 8 are formed in the first outer peripheral cutting edge 7A, the second outer peripheral cutting edge 7B, and the fifth outer peripheral cutting edge 7E, and one notch portion 8 is formed in the third outer peripheral cutting edge 7C and the fourth outer peripheral cutting edge 7D.

More specifically, a tip-side notch portion 8Aa and a rear end-side notch portion 8Ab are formed in the first outer peripheral cutting edge 7A, a tip-side notch portion 8Ba and a rear end-side notch portion 8Bb are formed in the second outer peripheral cutting edge 7B, a tip-side notch portion 8Ea and a rear end-side notch portion 8Eb are formed in the fifth outer peripheral cutting edge 7E, a notch portion 8Ca is formed in the third outer peripheral cutting edge 7C, and a notch portion 8Db is formed in the fourth outer peripheral cutting edge 7D.

As shown in FIG. 3, in the present embodiment, the disposition of all the notch portions 8Aa to 8Eb in the end mill body 1 is projected onto the same axis-perpendicular plane, the circumferential positions CR of the notch portions 8Aa to 8Eb do not overlap each other. Namely, the circumferential positions CR of all the notch portions 8Aa to 8Eb in the end mill body 1 are not only simply shifted in the circumferential direction (for example, the end mill rotation direction T), but also do not overlap in the circumferential direction.

The non-overlapping disposition does not include an overlapping disposition, but includes a separation disposition and an adjacent disposition. In addition, the lengths of the circumferential positions CR of the notch portions 8Aa to 8Eb may be the same or different.

In the present embodiment, the specific arrangement order of the circumferential positions CR (positions projected onto the same axis-perpendicular plane) of the notch portions 8Aa to 8Eb is 8Eb, 8Ba, 8Ab, 8Ca, 8Bb, 8Ea, and 8Db in order from the notch portion 8Aa of the first outer peripheral cutting edge 7A toward the rearward side in the rotation direction. Then, the circumferential positions CR of the notch portion 8Aa, the circumferential positions CR of the notch portion 8Eb, the circumferential positions CR of the notch portion 8Ba, the circumferential positions CR of the notch portion 8Ab, the circumferential positions CR of the notch portion 8Ca, the circumferential positions CR of the notch portion 8Bb, the circumferential positions CR of the notch portion 8Ea, and the circumferential positions CR of the notch portion 8Db do not overlap each other.

Since at least one outer peripheral cutting edge 7 includes the plurality of notch portions 8 in such a manner, it is possible to improve chip breaking ability, and make it difficult for chipping, which is caused by the biting of chips into the outer peripheral cutting edges 7, to occur. In addition, by setting the circumferential positions CR of all the notch portions 8 in the end mill body 1 to be different from each other, regardless of the number of the notch portions 8 in the end mill body 1, in other words, even when a large number of the notch portions 8 are provided, it is possible to avoid the occurrence of large local variations in cutting resistance during cutting. By reducing the amount of variation in cutting resistance and dispersing the timing of the variations, it is possible to make it difficult for chatter vibration to occur.

Therefore, in the present embodiment, due to the synergistic effect of at least one outer peripheral cutting edge 7 including the plurality of notch portions 8 and the circumferential positions of all the notch portions 8 in the end mill body 1 not overlapping each other, even in extremely efficient machining, it is possible not only to suppress the occurrence of chipping on the outer peripheral cutting edges 7, but also to suppress chatter vibration, so that more stable and high-efficiency machining can be performed. An exemplary example of the extremely efficient machining includes a cutting condition in which the axial cutting depth (ap) is equal to or more than two times the blade diameter (D), a cutting condition in which the cutting speed (Vc) is 250 m/min or more, a cutting condition in which the chip discharge rate (Q) is 250 cm³/min or more when the blade diameter is 10 mm, or a cutting condition in which two or more of the three conditions are combined.

As shown in FIG. 3, among spacings between the front ends in the rotation direction of two notch portions 8 that are adjacent in the circumferential position CR (for example, 8Aa and 8Eb), at least one spacing CS is different from the other spacing CS. With such a setting, it is possible to alleviate the periodicity of the timing that the cutting resistance decreases. As a result, even in extremely efficient machining, stable and high-efficiency machining in which the occurrence of chatter vibration or chipping is suppressed can be performed.

The end mill body 1 of the present embodiment shown in FIG. 1 has a diameter (D: blade diameter) of approximately 10 mm at a tip of the cutting edge portion 3 and a blade length (H) of approximately 30 mm (3D). As the axial length H of the outer peripheral cutting edges 7 (length of the outer peripheral cutting edges 7 when projected onto a straight line parallel to the axis) is increased, the axial cutting depth can be increased, so that more efficient cutting can be performed. On the other hand, as the axial length H (blade length) of the outer peripheral cutting edges 7 is lengthened, the machining efficiency is improved, but chatter vibration is more likely to occur. Particularly, when the ratio of the blade length H of the outer peripheral cutting edges to the blade diameter D (H/D) becomes large, for example, in the case of two times or more (H/D≥2), especially three times or more (H/D≥3), in order to shorten the chip length, the outer peripheral cutting edges 7 are provided with the notch portions 8 in many cases.

In the present embodiment, at least one outer peripheral cutting edge 7 includes the plurality of notch portions 8, the blade length H is set to be equal to or more than two times the blade diameter D, and all the notch portions 8 in the end mill body 1 are disposed such that the circumferential positions CR do not overlap each other. With this configuration, more efficient cutting can be performed, and even when the blade length H is increased, chips are less likely to be bitten by the outer peripheral cutting edges 7. Further, during cutting, the variation in cutting resistance is small and the timing of variations is dispersed, so that chatter vibration is also less likely to occur. Therefore, more efficient and stable machining can be performed due to the synergistic effect.

In the present embodiment, the five outer peripheral cutting edges 7 are provided; however, the number of the outer peripheral cutting edges 7 is not limited to five and may be six or more. By providing five or more outer peripheral cutting edges 7 in such a manner, the feed rate can be increased, and more efficient cutting can be performed. On the other hand, since increasing the feed rate causes the biting of chips to more likely occur, when the number of the notch portions is increased, chatter vibration is more likely to occur.

In the present embodiment, by disposing all the notch portions 8 in the end mill body 1 such that the circumferential positions CR do not overlap each other, even when the number of cutting edges and the number of the notch portions are increased, during cutting, variations in cutting resistance are small and the timing of the occurrence of the variations is dispersed, so that chatter vibration is less likely to occur. As a result, more stable and high-efficiency machining can be performed due to the synergistic effect.

In the present embodiment, the twist angles of all the outer peripheral cutting edges 7 are 40°. In the present embodiment, all the twist angles are set to 40°; however, the twist angles may be different between the outer peripheral cutting edges 7 as long as all the twist angles are 35° or more.

In the present embodiment, by disposing all the notch portions 8 in the end mill body 1 such that the circumferential positions of the notch portions 8 do not overlap each other, even when the twist angle is increased, during cutting, variations in cutting resistance are small and the timing of the occurrence of the variations is dispersed, so that chatter vibration is less likely to occur. As a result, more stable and high-efficiency machining can be performed due to the synergistic effect.

In addition, as shown in FIG. 3, in the outer peripheral cutting edge 7, a continuous blade length L2 of a portion that continues in the extending direction of the outer peripheral cutting edge 7 without being interrupted by the notch portion 8 corresponds to a chip length. In other words, the continuous blade length L2 is a length from the tip of the outer peripheral cutting edge 7 to the notch portion 8 located on the most tip side in the extending direction of the outer peripheral cutting edge, a length between the adjacent notch portions 8 in the same outer peripheral cutting edge, or a length from a rear end of the outer peripheral cutting edge 7 to the notch portion 8 located on the rearmost end side in the extending direction of the outer peripheral cutting edge. The chip length during cutting can be changed by adjusting the number of and the spacings between the notch portions 8 provided in each of the outer peripheral cutting edges 7. For example, chips cut at a tip portion of the first outer peripheral cutting edge 7A are broken off at the tip-side notch portion 8Aa, and chips cut at a central portion between the tip-side notch portion 8Aa and the rear end-side notch portion 8Ab are broken off at the rear end-side notch portion 8Ab.

In the present embodiment, among the continuous blade lengths L2 of the outer peripheral cutting edges 7, which continue in the extending direction of the outer peripheral cutting edges 7 without being interrupted by the notch portions 8, as indicated by a bold line in FIG. 3, a maximum continuous blade length $L2_{MAX}$ (namely, maximum chip length) in the end mill body 1 is 24.8 mm (2.5D) that is a distance from the notch portion 8Ca provided in the third outer peripheral cutting edge 7C to the rear end of the third outer peripheral cutting edge 7C. Among the continuous blade lengths L2 of the outer peripheral cutting edges 7, which continue in the extending direction of the outer peripheral cutting edges 7 without being interrupted by the notch portions 8, as indicated by a bold line in FIG. 3, a minimum continuous blade length $L2_{MIN}$ in the end mill body 1 is 9.1 mm (0.9D) that is a distance from the tip of the fifth outer peripheral cutting edge 7E to the tip-side notch portion 8Ea.

In such a manner, the notch portions 8 are disposed such that the maximum continuous blade length $L2_{MAX}$ becomes a length equal to or less than three times the blade diameter D (3D or less) of the end mill body 1. Accordingly, not only the circumferential dispositions of all the notch portions 8 in the end mill body are prevented from overlapping each other, but also cutting edge locations where the chip length becomes excessively large are eliminated. Therefore, there is an advantage that the biting of chips during cutting is less likely to occur and chipping of the outer peripheral cutting edges 7 is suppressed. On the other hand, in the related art, when a large number of the notch portions 8 are provided in the end mill body 1 such that the maximum continuous blade length $L2_{MAX}$ in the end mill becomes equal to or less than three times the blade diameter D, the notch portions 8 (for example, the notch portions 8 provided in the different outer peripheral cutting edges 7) are more likely to be aligned in the axial direction (the circumferential positions overlap each other), and during cutting, a location where variations in cutting resistance are locally large (location where the notch portions are concentrated) appears, and chatter vibration occurs, which is a concern.

In the present embodiment, by disposing all the notch portions 8 such that the circumferential positions CR of the notch portions 8 do not overlap each other and such that the maximum continuous blade length $L2_{MAX}$ in the end mill becomes equal to or less than three times the blade diameter D, more stable and high-efficiency machining can be performed.

In addition, by disposing the notch portions 8 such that the minimum continuous blade length $L2_{MIN}$ becomes equal to or more than 0.6 times the blade diameter D of the end mill body 1, the number of the notch portions 8 can be prevented from becoming excessive, and the number of locations where the cutting resistance varies can be prevented from becoming excessive.

Therefore, the notch portions 8 in the end mill body are disposed such that the circumferential positions CR of all the notch portions 8 do not overlap each other and such that the minimum continuous blade length $L2_{MIN}$ becomes a length equal to or more than 0.6 times the blade diameter D, so that more stable and high-efficiency machining can be performed.

Further, by disposing the notch portions 8 such that the maximum continuous blade length $L2_{MAX}$ becomes a length equal to or less than three times the blade diameter D and such that the minimum continuous blade length $L2_{MIN}$ becomes a length equal to or more than 0.6 times the cutting edge diameter, an appropriate level of variation in the continuous blade length L2 in the end mill body can be obtained, and chatter vibration can be further suppressed.

Therefore, the notch portions 8 in the end mill body are disposed such that the circumferential positions CR of all the notch portions 8 do not overlap each other and such that the maximum continuous blade length $L2_{MAX}$ becomes a length equal to or less than three times the blade diameter D and the minimum continuous blade length $L2_{MIN}$ becomes a length equal to or more than 0.6 times the blade diameter. Therefore, more stable and high-efficiency machining can be performed.

In the notch portion 8, the deepest location on the rake face 12 in the direction orthogonal to the extending direction of the outer peripheral cutting edge 7 is named as the deepest portion P. As shown in FIG. 3, many of axial spacings L1 between the deepest portions P of two notch portions 8 that are adjacent (closest) in axial position in the end mill body 1 are disposed at equal spacing. In the present embodiment, the axial spacings L1 between six deepest portions P that are adjacent in axial position in the end mill body 1 are set to 1.5 mm. By equalizing the disposition spacing (pitch) between the notch portions 8 that are adjacent in axial position in the end mill body 1, uneven cutting load between the outer peripheral cutting edges 7 can be prevented from being generated during cutting rotation of the end mill body 1.

In the present embodiment, all the outer peripheral cutting edges 7 extend at a constant twist angle from the tip to the rear end side in the axial direction of the end mill body 1, and the twist angles of all the outer peripheral cutting edges 7 are equal to each other.

In the related art, in order to suppress the occurrence of chatter vibration, a complicated configuration is known in which the twist angles are set differently between the outer peripheral cutting edges 7. In the present embodiment, at least one outer peripheral cutting edge 7 includes the plurality of notch portions 8, and the circumferential positions of all the notch portions 8 do not overlap each other. For this reason, in the present embodiment, even when the twist angles of all the outer peripheral cutting edges 7 are equal, the biting of chips are less likely to occur. In addition, in the present embodiment, during cutting, since variations in cutting resistance are small and the timing of the occurrence of the variations is dispersed, chatter vibration is less likely to occur. Therefore, according to the present embodiment, with a simpler configuration, high-efficiency cutting can be performed while suppressing chipping of the outer peripheral cutting edges 7.

As shown in FIG. 3, all the notch portions 8 are disposed such that the notch portion 8 closest to each of the notch portions 8 in axial position and the notch portion 8 closest thereto in circumferential position are the different notch portions 8. For example, the notch portions closest to the notch portion 8Ba in axial position are 8Aa and 8Ca, but the notch portions closest to the notch portion 8Ba in circumferential position are 8Eb and 8Ab, and both are different notch portions. According to this configuration, the disposition spacing between the notch portions 8 in the circumferential direction can be appropriately set, and during cutting, a location where variations in cutting resistance are locally large is less likely to appear, and chatter vibration is less likely to occur.

It is preferable that the notch portion 8 located on the most tip side in the axial direction in the end mill body 1 (the notch portion 8 provided in the fifth outer peripheral cutting edge 7E in FIG. 3) is formed at a position that is at a certain distance inward in the axial direction from a tip cutting edge of the end mill body 1. The reason for this is that even when the notch portion 8 is provided at a position close to the tip cutting edge of the end mill body 1, only short chips can be cut at the beginning of cutting, and the effect of shortening long chips is reduced. Similarly, it is preferable that the notch portion 8 located on the rearmost end side in the axial direction is also formed at a position that is a certain distance inward in the axial direction from a rear cutting edge of the end mill body 1.

Therefore, a plurality of the notch portions 8 formed in each of the outer peripheral cutting edges 7 are formed relatively in the vicinity of the center of the cutting edge portion 3, so that chips can be efficiently shortened with a small number of the notch portions 8.

The end mill body 1 of the present embodiment is an unequal division end mill in which the circumferential spacings of all the outer peripheral cutting edges 7 adjacent in the circumferential direction (end mill rotation direction T) in an axis-perpendicular cross section are different from each other. Namely, as shown in FIG. 4, in a cross-sectional view orthogonal to the axis O, the five outer peripheral cutting edges 7 are disposed at different division angles instead of being equally divided and disposed around the axis. Chatter vibration can be further suppressed by differently setting the circumferential spacings between the outer peripheral cutting edges 7 in an axis-perpendicular cross section in such a manner.

In the present embodiment, as shown in FIG. 4, in an axis-perpendicular cross section, an angle formed by a straight line connecting an outer peripheral cutting edge 7 and the axis O and a straight line connecting the outer peripheral cutting edge 7 adjacent to that outer peripheral cutting edge 7 in the circumferential direction and the axis O (division angle θ) is the smallest at θ1 and increases in order of θ1<θ2<θ3<θ4<θ5. Namely, in the axis-perpendicular plane, the spacing between the first outer peripheral cutting edge 7A and the second outer peripheral cutting edge 7B located opposite the end mill rotation direction T from the first outer peripheral cutting edge 7A is the smallest. In addition, in the axis-perpendicular cross section, the spacing between the first outer peripheral cutting edge 7A and the fifth outer peripheral cutting edge 7E located on a forward side in the end mill rotation direction T of the first outer peripheral cutting edge 7A is the largest.

In the present embodiment, the circumferential spacings adjacent in the circumferential direction between the five outer peripheral cutting edges 7, namely, the division angles θ (θ1 to θ5) are all different, but some of the division angles may be the same division angle θ.

As shown in FIGS. 3 and 4, in the present embodiment, the notch portion 8Bb located on the rearmost end side in the axial direction among the notch portions 8 in the end mill body 1 is provided in the outer peripheral cutting edge 7B with the smallest circumferential spacing (division angle) to the outer peripheral cutting edge 7 that is adjacent forward in the rotation direction in an axis-perpendicular plane taken at the rearmost end of the cutting edge portion 3, among the five outer peripheral cutting edges 7. Namely, the notch portion 8Bb located on the rearmost end side in the axial direction among the notch portions 8 in the end mill body 1 is provided in the outer peripheral cutting edge 7B with the smallest workload, so that chipping in the vicinity of the rear end of the outer peripheral cutting edge can be effectively suppressed.

Since the notch portion 8 is a discontinuous location in the outer peripheral cutting edge 7, stress is more likely to concentrate and chipping is more likely to occur. Moreover, it is difficult for stress to escape at a position close to a grip portion (namely, the shank portion 2). For this reason, by providing the notch portion 8 located on the rearmost end side in the axial direction, in the outer peripheral cutting edge 7 with the smallest workload (the smallest division angle), the concentration of stress can be alleviated, and chipping of the outer peripheral cutting edges 7 is further suppressed.

Second Embodiment

Figure 5:
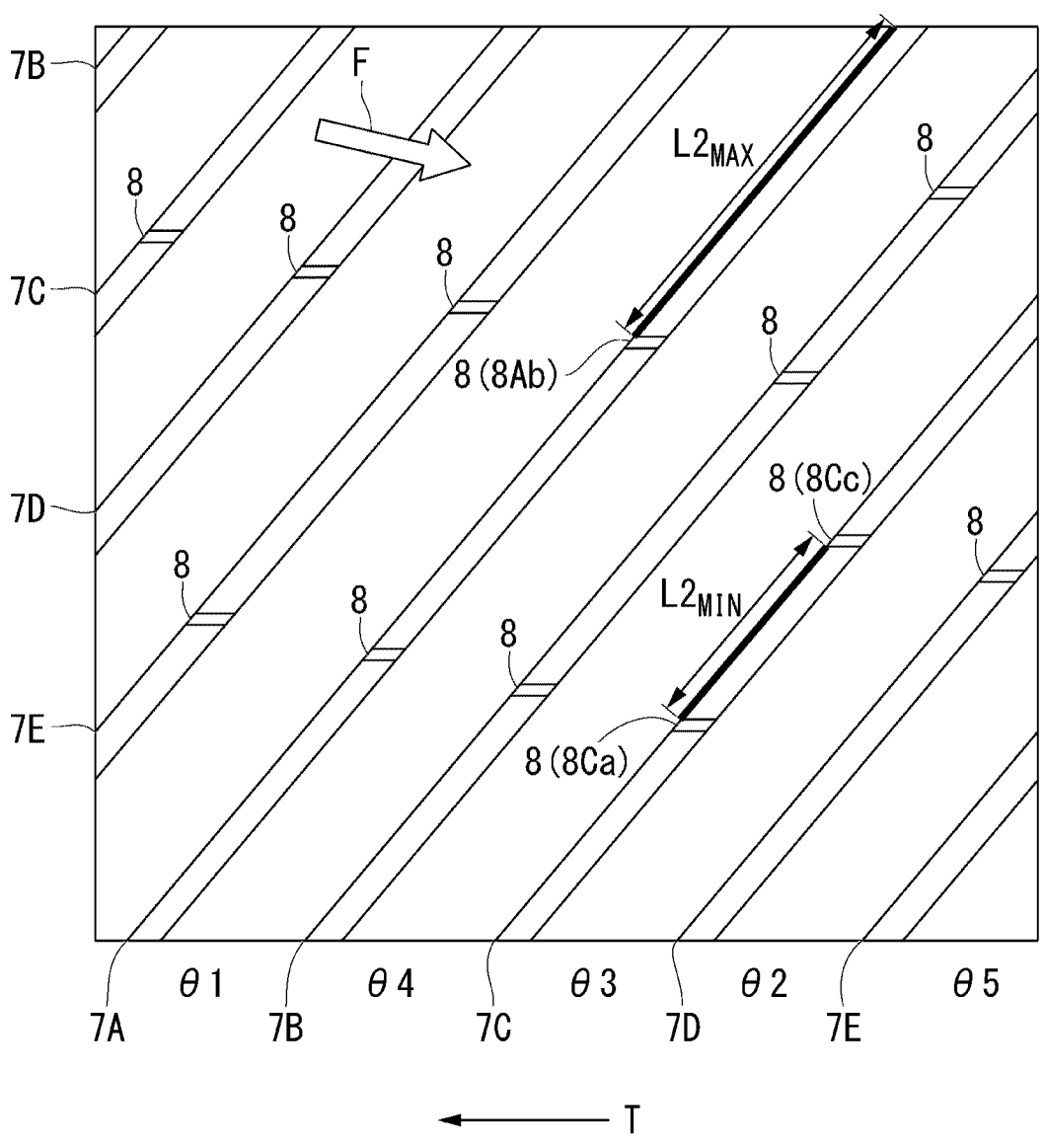
FIG. 5 is a developed view schematically showing the entirety of an outer peripheral surface of a cutting edge portion of an end mill according to a second embodiment.

Next, a configuration of an end mill according to a second embodiment will be described. FIG. 5 is a developed view of the entirety of an outer peripheral surface of the cutting edge portion 3 of an end mill body 21 according to the second embodiment. In the second embodiment as well, similarly to the first embodiment, the circumferential positions CR of all the notch portions 8 in the end mill body 21 (FIG. 3) do not overlap each other. In addition, the twist angle, the spacing (division angle) between the outer peripheral cutting edges 7, and the like are the same as in the first embodiment. The end mill body 21 of the present embodiment has a blade diameter D (FIG. 1) of approximately 20 mm and a blade length (H) of approximately 60 mm.

The different point from the first embodiment is that the first outer peripheral cutting edge 7A, the fourth outer peripheral cutting edge 7D, and the fifth outer peripheral cutting edge 7E are each provided with two notch portions 8 and the second outer peripheral cutting edge 7B and the third outer peripheral cutting edge 7C are each provided with three notch portions 8. In addition, the maximum continuous blade length $L2_{MAX}$ is 1.5D, and the minimum continuous blade length $L2_{MIN}$ is 0.8D.

In the first embodiment, as shown in FIG. 3, all the notch portions 8 in the end mill body 1 are disposed such that among two notch portions 8 that are adjacent in axial position, the circumferential position of the notch portion 8 located on the rear end side is located rearward in the rotation direction with respect to the notch portion 8 located on the tip side (right-upward disposition). On the other hand, in the present embodiment, as shown in FIG. 5, all the notch portions 8 in the end mill body 21 are disposed such that among two notch portions 8 that are adjacent in axial position, the circumferential position of the notch portion 8 located on the rear end side is located forward in the rotation direction with respect to the notch portion 8 located on the tip side (right-downward disposition). Namely, as indicated by arrow F in FIG. 5, all the notch portions 8 are disposed in an inclination direction (downward to the right) opposite an inclination direction of the outer peripheral cutting edges 7. In such a manner, by arranging the notch portions 8 in a direction opposite a twist direction of the outer peripheral cutting edges, the circumferential (end mill rotation direction T) spacing between the notch portions 8 that are adjacent in circumferential position can be further reduced, so that the notch portions 8 can be disposed at a higher density, and a larger number of the notch portions 8 can be disposed.

Particularly, when the blade diameter D (FIG. 1) of the end mill body 21 is large, in order to form a required number of the notch portions 8, it is preferable that all the notch portions 8 are disposed in the end mill body in the direction opposite the twist direction of the outer peripheral cutting edges (when the outer peripheral cutting edges are rightward twisted shown in FIG. 5, right-downward disposition). Particularly, when the blade diameter D is 12 mm or more, it is preferable that all the notch portions 8 are disposed to be twisted in the direction opposite the twist direction of the outer peripheral cutting edges. Further, as the ratio of the blade length H to the blade diameter D increases, the number of the notch portions 8 required to ensure sufficient chip breaking ability increases, so that it is preferable that all the notch portions 8 are disposed in the direction opposite the twist direction of the outer peripheral cutting edges. By disposing the notch portions 8 in such a manner, a larger number of the notch portions 8 can be disposed while preventing the circumferential position of each of the notch portions 8 from overlapping the circumferential positions of the other notch portions 8 in the end mill rotation direction T over the entirety in the axial direction (blade length) of the cutting edge portion 3. As a result, more efficient cutting can be performed while suppressing chipping of the outer peripheral cutting edges 7.

Since the notch portion 8 is a discontinuous location in the outer peripheral cutting edge 7, stress is more likely to concentrate and chipping is more likely to occur. Moreover, stress is less likely to relieved in a portion closer to a grip portion (that is, the shank portion 2) side.

In the present embodiment, as shown in FIG. 5, the outer peripheral cutting edge 7B with the smallest circumferential spacing (division angle) to the outer peripheral cutting edge 7 that is adjacent forward in the rotation direction is provided with the notch portion 8 located on the rearmost end side in the axial direction among all the notch portions 8 in the end mill body 21. In such a manner, by disposing the notch portion 8 located on the rearmost end side in the axial direction among all the notch portions 8 in the end mill body 21, in the outer peripheral cutting edge 7B with the smallest cutting amount, chipping of the outer peripheral cutting edges 7 on the rear end side in the axial direction can be suppressed.

Exemplary embodiments according to the present invention have been described above with reference to the accompanying drawings; however, it goes without saying that the present invention is not limited to the embodiments. It is obvious that those skilled in the art can conceive various modification examples or revision examples within the scope of the technical concept described in the appended claims, and it is also understood that such modification examples and revision examples are within the technical scope of the present invention. The configurations of the embodiments may be combined as appropriate.

For example, it is preferable that the number of the outer peripheral cutting edges 7 of the end mill bodies 1 and 21 or the number of the notch portions 8 provided in each of the outer peripheral cutting edges 7 is appropriately set depending on cutting conditions such as the blade diameter D, the blade length H, and the hardness and the cutting speed of a workpiece.

In each of the embodiments described above, all the outer peripheral cutting edges 7 in the end mill bodies 1 and 21 include the notch portions 8; however, the outer peripheral cutting edge 7 not including the notch portion 8 may exist.

EXAMPLES

By gripping each of radius end mills with a blade diameter of 10 mm in Example 1 (first embodiment) of the present invention, Comparative Example 1, and Comparative Example 2 using a spindle of a machine tool, and by rotating the radius end mill in the end mill rotation direction T around the axis O under the following cutting conditions, a workpiece with a hardness of 30 HRC was subject to pocket machining for 120 minutes through trochoidal machining under the following cutting conditions using a machine tool (HSK A63) manufactured by DMG Mori Seiki Co., Ltd. Then, the vibration frequency during cutting was analyzed, and the presence or absence of chatter vibration or the presence or absence of chipping of the outer peripheral cutting edges was verified.

(Cutting Conditions)
  Cutting speed (Vc): 300 m/min
  Revolution Number (n): 9549 min$^{-1}$
  Feed speed (vf): 9549 mm/min
  Feed per tooth (fz): 0.2 mm/t
  Cutting depth (ap): 29 mm
  Cutting width (ac): 1 mm
  Chip removal volume Q: 277 cm$^3$/min The end mill of Example 1 is the end mill of the first embodiment and is an unequal division end mill with five outer peripheral cutting edges as described above. Three outer peripheral cutting edges 7 are each provided with two notch portions 8, and the remaining two outer peripheral cutting edges 7 are each provided with one notch portion 8. In addition, the circumferential positions CR of all the notch portions 8 in the end mill body 1 do not overlap each other. Comparative Example 1 is also an unequal division end mill with five outer peripheral cutting edges, and the division angle is the same as in the first embodiment. However, in Comparative Example 1, each of all the outer peripheral cutting edges 7 includes two notch portions 8, and as shown in a schematic view of FIG. 6, the circumferential positions CR of a plurality of the notch portions 8 overlap each other. In Comparative Example 2, each of all the outer peripheral cutting edges 7 includes only one notch portion 8, and the circumferential positions CR of all the notch portions 8 in the end mill body do not overlap each other.

From experiments performed in the past, as machining sound during machining become higher and as the undulation visually observed on a machined surface after machining became larger, greater vibration intensity without periodicity appeared in a frequency range of 4000 Hz to 5000 Hz. In addition, even when the difference in machining sound or the state of the machined surface visually observed was small, slight chatter vibration could appear as vibration intensity without periodicity, so that in order to evaluate the stability of machining in high-efficiency machining, chatter vibration was evaluated using frequency analysis.

Figure 6:
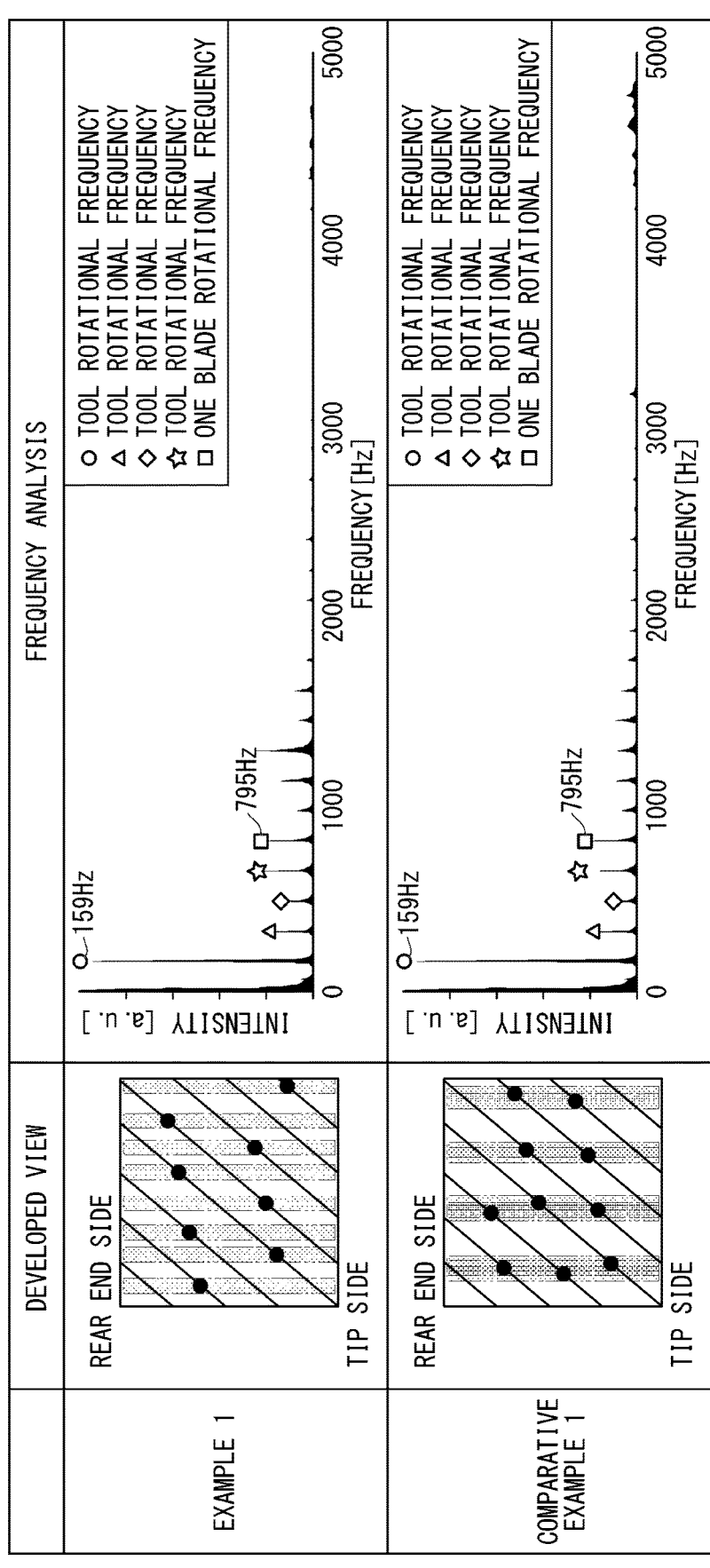
FIG. 6 is a graph showing frequency analysis results of Example 1 and Comparative Example 1.

FIG. 6 is a graph showing frequency analysis results of Example 1 and Comparative Example 1. The horizontal axis of FIG. 6 indicates the vibration frequency (rotational frequency) of the end mill body 1 generated during cutting of a workpiece, and the vertical axis indicates the intensity. The developed view of Example 1 in FIG. 6 corresponds to the developed view (FIG. 3) of the cutting edge portion 3 of the first embodiment described above, and is a schematic description of the developed view of FIG. 3. In FIG. 6, the locations indicated by black circles represent the notch portions 8. In Example 1, it is indicated that the circumferential positions of all the notch portions 8 in the end mill do not overlap each other. On the other hand, In Comparative Example 1, it is indicated that the circumferential positions of the plurality of notch portions 8 overlap each other.

As shown in FIG. 6, in the first embodiment in which one or two notch portions 8 were formed in the outer peripheral cutting edge and all the notch portions 8 were disposed such that the circumferential positions CR did not overlap each other, almost no vibration intensity was confirmed in a frequency range of approximately 4000 Hz to 5000 Hz. On the other hand, in Comparative Example 1 in which each outer peripheral cutting edge was provided with two notch portions 8 and the circumferential positions of the plurality of notch portions 8 overlapped each other, vibration of a certain intensity without periodicity occurred in a frequency range of approximately 4000 Hz to 5000 Hz. In addition, in Comparative Example 2, the intensity was smaller than in Comparative Example 1, but vibration was confirmed.

In addition, in Example 1 and Comparative Example 1, even when high-efficiency machining was performed for 120 minutes with a large axial cutting depth and a high cutting speed as described above, chipping did not occur on the outer peripheral cutting edges, but in Comparative Example 2, chipping occurred on the outer peripheral cutting edges after 30 minutes from the start of cutting.

From the above, it was found that in Example 1, even when extremely efficient side cutting was performed, cutting could be stably performed for a long period of time.

REFERENCE SIGNS LIST

1: End mill body
4: Chip discharge groove
7 (7A, 7B, 7C, 7D, 7E): Outer peripheral cutting edge
8 (8Ab, 8Ba, 8Bb, 8Ca, 8db, 8Ea, 8Eb): Notch portion
9: Non-cutting region
10: End mill
11: Outer peripheral flank face
12: Rake face
CR: Circumferential position of notch portion 8
CS: Spacing between front ends in rotation direction of two notch portions 8 adjacent in circumferential direction
D: Blade diameter
H: Blade length
L1: Axial spacing between deepest portions on rake face that are adjacent in axial position
L2: Continuous blade length that continues in extending direction of outer peripheral cutting edge
P: Deepest portion
O: Axis
T: End mill rotation direction
θ: Division angle

The invention claimed is:
1. An end mill comprising:
an end mill body configured to be rotatable around an axis;
chip discharge grooves configured to extend from a tip side in an axial direction of the end mill body toward a rear end side in the axial direction while twisting around the axis; and
outer peripheral cutting edges each being configured to be formed at an intersection ridge portion on a forward side in a rotation direction between the chip discharge groove and an outer peripheral flank face, wherein at least one outer peripheral cutting edge includes a plurality of notch portions that discontinue the outer peripheral cutting edge, each of the notch portions is a recessed groove extending in a circumferential direction with a non-cutting region on an extension line of the outer peripheral cutting edge, and when viewed in the axial direction, the notch portions do not overlap with each other across the entire recessed groove of each notch.

2. The end mill according to claim 1, circumferential positions from a front end to a rear end in the rotation direction of all the notch portions in the end mill body do not overlap each other.

3. The end mill according to claim 1, wherein among spacings between front ends in the rotation direction of two notch portions adjacent in a circumferential direction, at least one spacing is different from the other spacings.

4. The end mill according to claim 1, wherein a blade length is equal to or more than two times a blade diameter.

5. The end mill according to claim 1, wherein five or more outer peripheral cutting edges are provided.

6. The end mill according to claim 1, wherein twist angles of all the outer peripheral cutting edges are 35° or more.

7. The end mill according to claim 1, wherein the notch portions are disposed such that among continuous blade lengths which continue in an extending direction of the outer peripheral cutting edges, a maximum continuous blade length in the end mill body is equal to or less than three times a blade diameter.

8. The end mill according to claim 1, wherein the notch portions are disposed such that among continuous blade lengths which continue in an extending direction of the outer peripheral cutting edges, a minimum continuous blade length in the end mill body is equal to or more than 0.6 times a blade diameter.

9. The end mill according to claim 1, wherein twist angles of all the outer peripheral cutting edges are equal to each other.

10. The end mill according to claim 1, wherein each of the notch portions is disposed such that the other notch portion closest to the notch portion in axial position is a different notch portion from the other notch portion closest to the notch portion in circumferential position.

11. The end mill according to claim 1, wherein the outer peripheral cutting edges are rightward twisted, and all the notch portions are disposed such that among two of the notch portions which are adjacent in axial position, the notch portion located on the rear end side is located forward in the rotation direction with respect to the notch portion located on the tip side.

* * * * *